US012625116B2

(12) United States Patent
Komori et al.

(10) Patent No.: US 12,625,116 B2
(45) Date of Patent: May 12, 2026

(54) GAS MONITORING DEVICE FOR GAS CHROMATOGRAPH

(71) Applicant: SHIMADZU CORPORATION, Kyoto (JP)

(72) Inventors: Yuki Komori, Kyoto (JP); Shori Kinoshita, Kyoto (JP); Nami Hongo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 352 days.

(21) Appl. No.: 18/438,215

(22) Filed: Feb. 9, 2024

(65) Prior Publication Data

US 2024/0319147 A1    Sep. 26, 2024

(30) Foreign Application Priority Data

Mar. 23, 2023    (JP) ................................. 2023-046412

(51) Int. Cl.
  *G01N 30/30*    (2006.01)
  *G01F 1/69*    (2006.01)
  *G01F 1/696*    (2006.01)
  *G01N 30/02*    (2006.01)
(52) U.S. Cl.
  CPC .............. *G01N 30/30* (2013.01); *G01F 1/69* (2013.01); *G01F 1/696* (2013.01); *G01N 2030/025* (2013.01)

(58) Field of Classification Search
  CPC ........... G01N 2030/3084; G01N 30/30; G01N 2030/025; G01F 1/6965; G01F 1/684; G01F 1/69
  See application file for complete search history.

(56) References Cited

U.S. PATENT DOCUMENTS 7,631,555 B2 * 12/2009 Nakano ................. G01F 1/6965
                                                        73/204.26
7,836,750 B2 * 11/2010 van den Heuvel .... G01N 30/34
                                                            73/40
2008/0121015 A1    5/2008 Heuvel et al.

FOREIGN PATENT DOCUMENTS

JP          2008-129013 B      6/2008

* cited by examiner

*Primary Examiner* — Justin N Olamit
(74) *Attorney, Agent, or Firm* — Muir Patent Law, PLLC

(57)    ABSTRACT

A gas monitoring device for gas chromatograph comprises a pump to remove gas in a column oven of the gas chromatograph, a flow rate detection unit including a self-heating element arranged in a measurement flow path, a temperature acquisition unit configured to acquire temperature information about the gas flowing into the measurement flow path, and a controller configured to set the reference temperature of the self-heating element of the flow rate detection unit to a temperature of the gas flowing into the measurement flow path based on the temperature information acquired by the temperature acquisition unit and determine normality of the operation of the pump based on the signal acquired by the flow rate detection unit.

10 Claims, 5 Drawing Sheets

FIG. 3

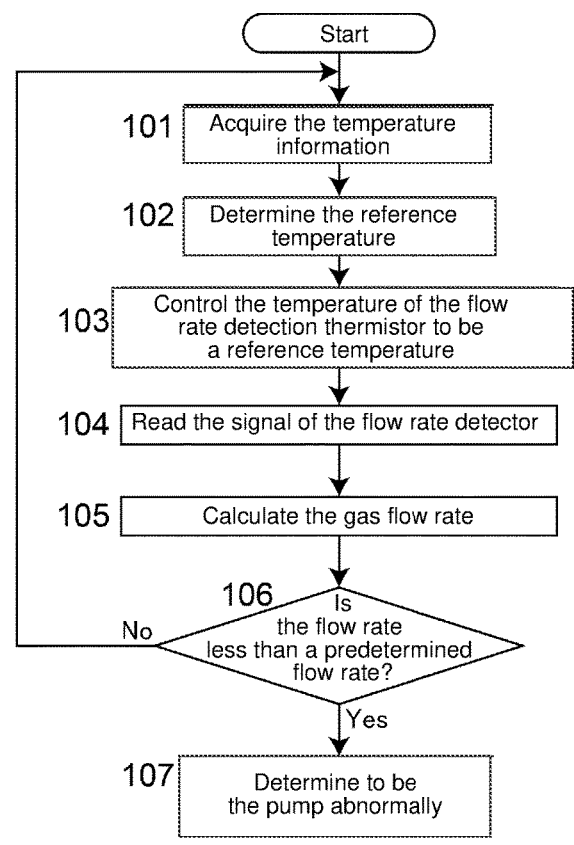

Start

101 Acquire the temperature information

102 Determine the reference temperature

103 Control the temperature of the flow rate detection thermistor to be a reference temperature 104 Read the signal of the flow rate detector 105 Calculate the gas flow rate 106 Is the flow rate less than a predetermined flow rate?

No

Yes

107 Determine to be the pump abnormally

FIG. 4

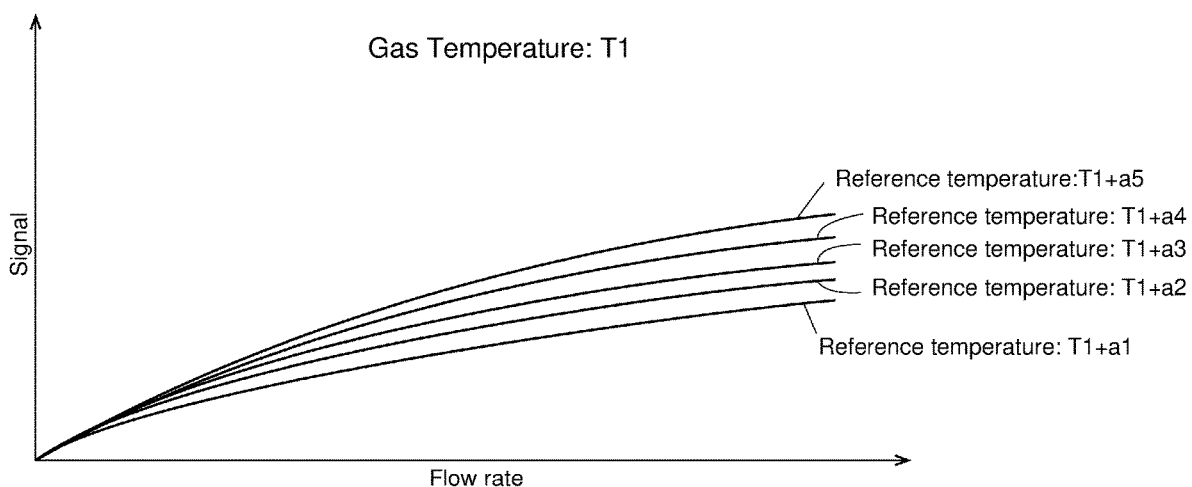

Gas Temperature: T1

Reference temperature:T1+a5
Reference temperature: T1+a4
Reference temperature: T1+a3
Reference temperature: T1+a2
Reference temperature: T1+a1

Signal

Flow rate

Gas termperature: $T2 (>T1)$

Signal

Reference temperature:T2+a4

Reference temperature:T2+a3
Reference temperature:T2+a2

Reference temperature:T2+a1

Reference temperature:T2+a5

Flow rate 16          from the column oven          32          28

24          34 to the pump          20
          21

25

30          40          4          38          36

Gas inflow direction into the measurement flow path

Flow path direction

20

Longitudinal direction of the thermistor

Plane parallel to the flow
path direction

GAS MONITORING DEVICE FOR GAS CHROMATOGRAPH

CROSS-REFERENCE TO RELATED APPLICATIONS

This application claims priority under 35 U.S.C. § 119 to Japanese Patent Application No. 2023-046412 filed on Mar. 23, 2023, the entire disclosure of which is incorporated herein by reference in its entirety.

BACKGROUND OF THE INVENTION

Field of the Invention

The present disclosure relates to a gas monitoring device for monitoring a gas leakage in a gas chromatograph (in this disclosure, also simply referred to as "GC").

Description of the Related Art

The following description sets forth the inventor's knowledge of the related art and problems therein and should not be construed as an admission of knowledge in the prior art.

In a GC, a gas flows through a pipe such as a column. In a case where the column is damaged or a pipe connection seal is inadequate, a gas leakage will occur, causing various problems. In particular, in a case where a flammable gas, such as a hydrogen gas, is used as a carrier gas in a GC, there is a risk of explosion or other hazards if the column oven is used in a state in which a flammable gas is leaking in the column oven.

Therefore, it has been proposed to monitor a flammable gas leakage in a column oven by using a gas detector that detects a gas, such as a hydrogen gas (see Patent Document 1). The gas detector detects the concentration of the flammable gas in the air taken in by sucking the air in the column oven by means of a pump. With such a gas detector, when the concentration of the flammable gas in the sucked air exceeds a predetermined concentration, an error message is displayed on a display or other means, or the heating of the column oven and the supply of a carrier gas are suspended. This prevents occurrence of accidents.

By the way, in the event that the pump of the gas detector malfunctions and fails to draw in the gas in the column oven normally, the gas detector will not detect any flammable gas despite the fact that there is a leakage of a flammable gas into the column oven. For this reason, it has also been proposed to monitor whether the pump is operating properly by detecting a flow rate of a gas which is being drawn into a gas detector.

PRIOR ART DOCUMENTS

Patent Documents

Patent Document 1: Japanese Unexamined Patent Application Publication No. 2008-129013

As a mechanism for detecting the flow rate of a gas to be taken into a gas detector, a mechanism using a self-heating element can be exemplified. The detection of a gas flow rate using a self-heating element is performed by acquiring a signal corresponding to a heat quantity deprived from the gas by the self-heating element. In a GC, however, in some cases, an analysis is performed while changing the temperature in the column oven over a wide range. In such a case, if the temperature of the self-heating element is maintained constant during the analysis, the gas flow rate may not be accurately detected.

SUMMARY OF THE INVENTION

The present disclosure has been made to solve the above problems. The purpose of the present disclosure is to provide a gas monitoring device for gas chromatograph capable of accurately detecting a flow rate of a gas to be drawn in from a column oven and accurately determining the normality of a pump's operation even in an environment in which the temperature in the column oven varies greatly.

A gas monitoring device for gas chromatograph, includes:
a pump configured to draw out a gas from a space in a column oven of the gas chromatograph;
a measurement flow path through which the gas drawn out of the space in the column oven by the pump flows;
a gas sensor having a sensing unit exposed to an inside of the measurement flow path, the gas sensor being configured to detect a specific component in the gas flowing through the measurement flow path;
a flow rate detection unit including a self-heating element arranged in the measurement flow path, the flow rate detection unit being configured to acquire a signal corresponding to a flow rate of the gas flowing through the measurement flow path by controlling a voltage applied to the self-heating element so that a temperature of the self-heating element is kept constant at a reference temperature;
a temperature acquisition unit configured to acquire temperature information about the gas flowing into the measurement flow path; and
a controller configured to control operations of the pump and the flow rate detection unit,
wherein the controller is configured to
set the reference temperature of the self-heating element of the flow rate detection unit to a temperature of the gas flowing into the measurement flow path based on the temperature information acquired by the temperature acquisition unit and
determine normality of the operation of the pump based on the signal acquired by the flow rate detection unit.

The gas monitoring device for gas chromatograph according to the present disclosure is provided with a temperature acquisition unit configured to acquire temperature information about a gas flowing into the measurement flow path. The voltage applied to the self-heating element is controlled based on the temperature information acquired by the temperature acquisition unit so that the reference temperature of the self-heating element of the flow rate detection unit is set to a temperature of the gas flowing into the measurement flow path. Therefore, the flow rate of the gas flowing through the measurement flow path can be accurately detected. With this, it is possible to accurately determine whether the pump is being operated normally.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present disclosure are shown by way of example, and not limitation, in the accompanying figures.

FIG. 3 is a flowchart showing one example of a pump determination operation in this example.

FIG. 4 is a graph showing a correlation between a flow rate and a signal value at each reference temperature when a temperature of a gas flowing into a measurement flow path is T1.

DETAILED DESCRIPTION OF THE PREFERRED EMBODIMENTS

In the following paragraphs, some preferred embodiments of the present disclosure will be described by way of example and not limitation. It should be understood based on this disclosure that various other modifications can be made by those skilled in the art based on these illustrated embodiments.

Hereinafter, one example of a gas monitoring device for gas chromatograph (in this disclosure, may be referred to as "GC") will be described with reference to the attached drawings.

Figure 1:
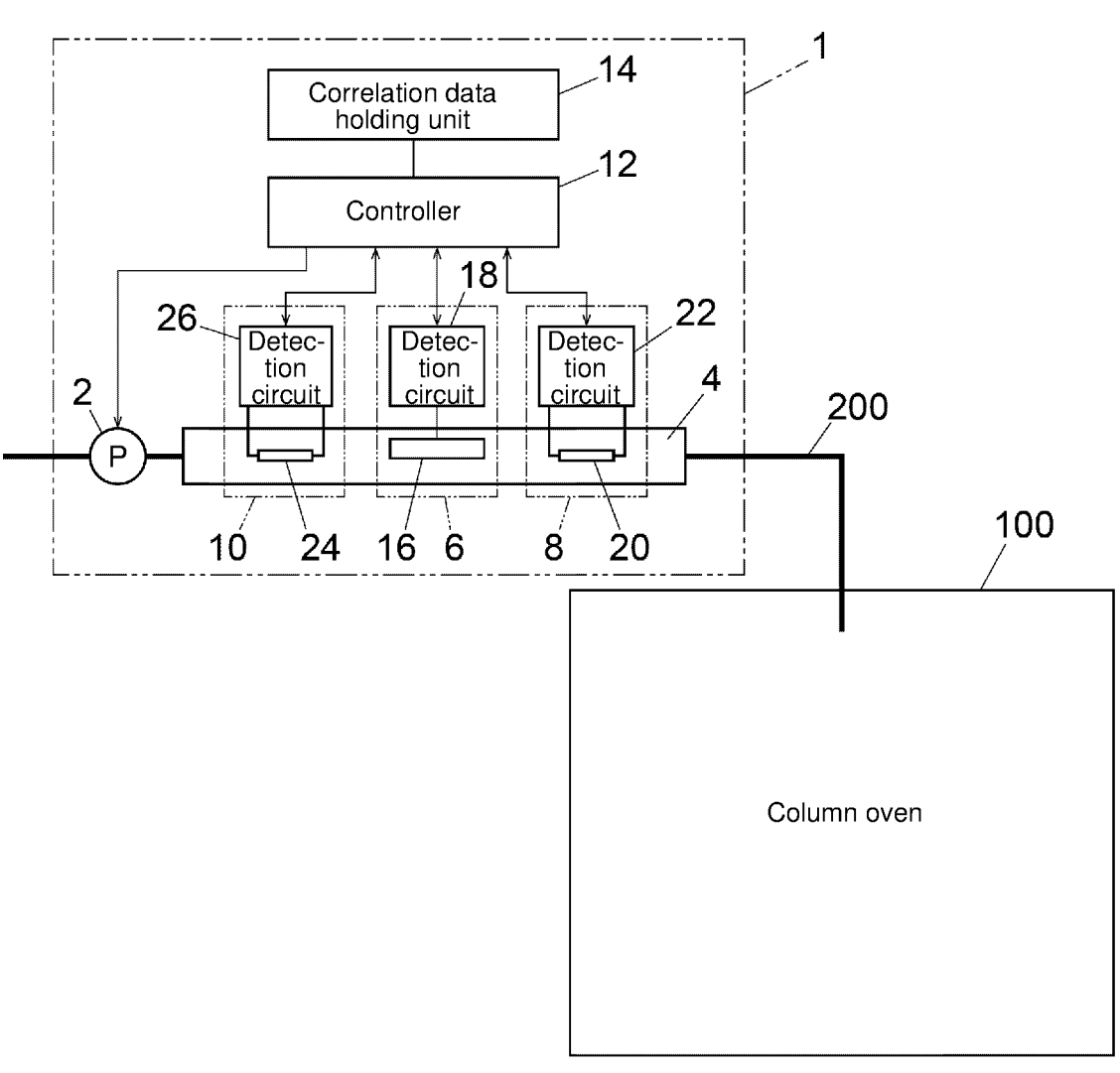
FIG. 1 is a schematic diagram showing one example of a gas monitoring device for gas chromatograph.

As shown in FIG. 1, the gas monitoring device 1 for GC is equipped with a pump 2, a measurement flow path 4, a gas sensor 6, a flow rate detection unit 8, a temperature acquisition unit 10, a controller 12, and a correlation data holding unit 14. The pump 2 is fluidly connected to one end of the measurement flow path 4. The other end of the measurement flow path 4 is fluidly connected to the space in the column oven 100 of the GC via the pipe 200, and when the pump 2 is driven, a gas is drawn out from the column oven 100 and flows through the measurement flow path 4.

The gas sensor 6 is a sensor for detecting specific components in the gas flowing through the measurement flow path 4. The gas sensor 6 has a sensing unit 16 and a detection circuit 18, and the sensing unit 16 is exposed to the inside of the measurement flow path 4. In this example, the gas sensor 6 is a hydrogen sensor that detects the hydrogen gas concentration in the gas flowing through the measurement flow path 4.

The flow rate detection unit 8 is a sensor for detecting the flow rate of the gas flowing through the measurement flow path 4 and is provided with a thermistor 20 (self-heating element) and a detection circuit 22. The thermistor 20 is a sensing unit of the flow rate detection unit 8 and is placed upstream of the sensing unit 16 of the gas sensor 6 in the measurement flow path 4.

Figure 2:
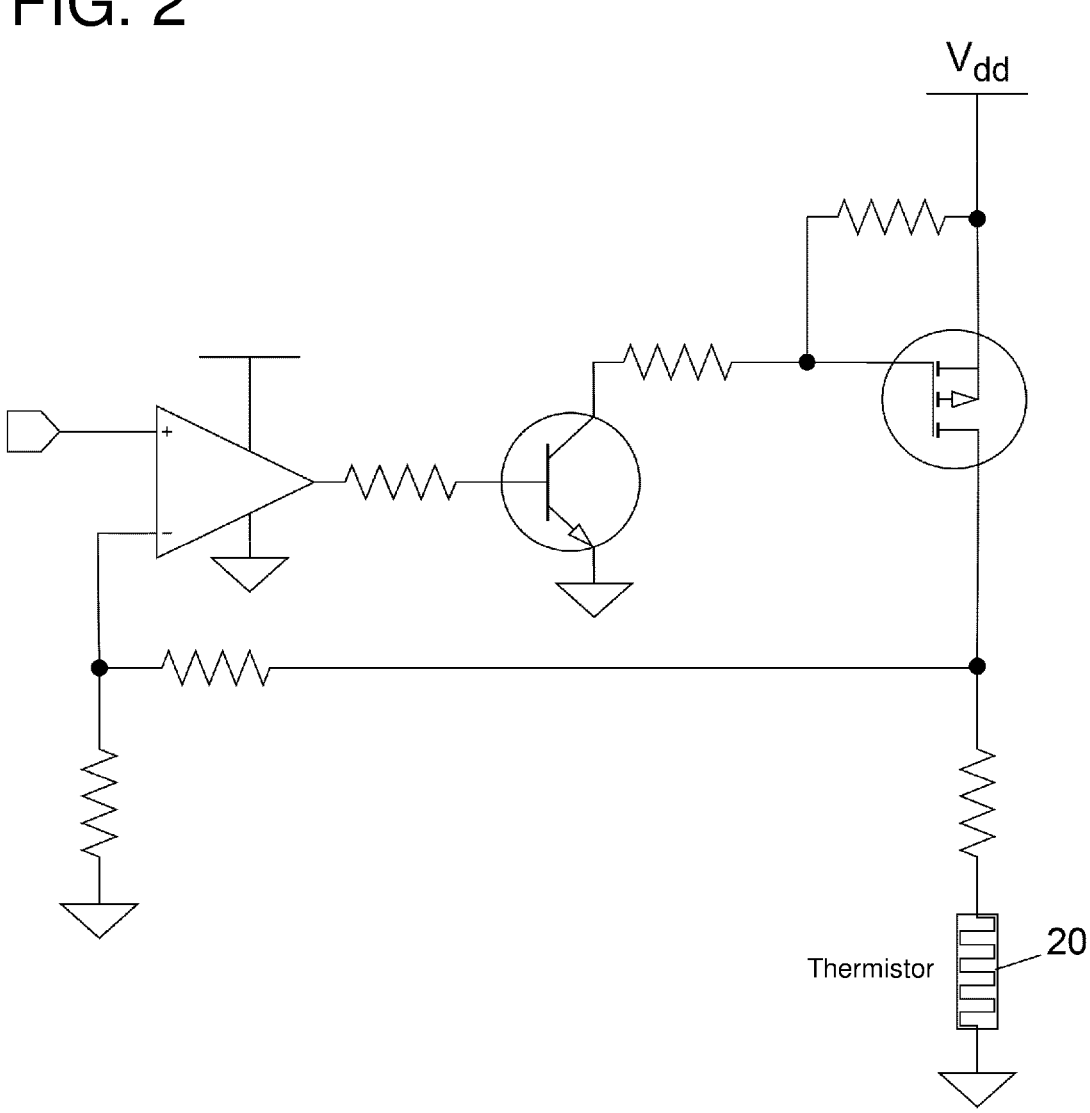
FIG. 2 is a circuit diagram showing one example of a detection circuit of an air flow rate detection unit.

The detection circuit 22 is, as shown in FIG. 2 as an example, a circuit for acquiring a signal corresponding to the flow rate of the gas flowing through the measurement flow path 4 by controlling the voltage applied to the thermistor 20 so that the temperature of the thermistor 20 is set to a reference temperature.

The voltage to be applied to the thermistor 20 to bring the thermistor 20 to the reference temperature in a state in which no gas is flowing through the measurement flow path 4 is known in advance. The voltage applied to the thermistor 20 when a gas is flowing through the measurement flow path 4 is acquired, and the difference between the above voltage and a voltage applied to the thermistor 20 when a gas is not flowing through the measurement flow path 4 is taken. With this, it is possible to acquire a signal corresponding to the flow rate of the gas flowing through the measurement flow path 4. The reference temperature of the thermistor 20 is set according to the temperature of the gas flowing through the measurement flow path 4. The information on the temperature of the gas flowing through the measurement flow path 4 is acquired by the temperature acquisition unit 10, which will be described later.

The temperature acquisition unit 10 is used to detect the temperature of the gas flowing through the measurement flow path 4 (flowing into the measurement flow path) and is equipped with a thermistor 24 (temperature sensor) and a detection circuit 26. The thermistor 24 is a sensing unit of the temperature acquisition unit 10 and is arranged downstream from the sensing unit 16 of the gas sensor 6 in the measurement flow path 4. The detection circuit 26 is a circuit for acquiring a signal corresponding to the temperature of the gas flowing through the measurement flow path 4 by the thermistor 24.

Note that in this example, the temperature acquisition unit 10 is configured to acquire the actual measurement of the temperature of the gas flowing through the measurement flow path 4, but the present disclosure is not limited thereto. The temperature of the gas flowing into the measurement flow path 4 can be determined from the temperature of the gas in the column oven 100. For this reason, the temperature acquisition unit 10 may be realized by a function that acquires the information on the set temperature of the column oven 100 from the controller of the column oven 100.

Further, in this example, the temperature acquisition unit 10, which acquires the actual measurement of the temperature of the gas flowing through the measurement flow path 4, is provided as a configuration separate from the flow rate detection unit 8, but it is possible to have the flow rate detection unit 8 function as the temperature acquisition unit 10 as well. In such a case, the voltage application to the thermistor 20 is turned off to allow the thermistor 20 to function as a sensing unit for a temperature detection, and thereafter, a voltage is applied to the thermistor 20 to allow the thermistor 20 to function as a sensing unit for a flow rate detection. As described above, the temperature acquisition unit 10 can be omitted by having the thermistor 20 function intermittently as a sensing unit for a temperature detection and a sensing unit for a flow rate detection.

The controller 12 controls the pump 2, the gas sensor 6, the flow rate detection unit 8, and the temperature acquisition unit 10 to monitor the hydrogen concentration in the gas in the column oven 100 and determines whether the pump 2 is operating properly. The controller 12 is a function realized by an electronic circuit with a CPU (central processing unit).

The correlation data holding unit 14 stores correlation data showing the correlation between the temperature of the gas flowing through the measurement flow path 4 and the temperature to be set as the reference temperature of the thermistor 20 of the flow rate detection unit 8, as well as correlation data acquired in advance between the flow rate of the gas flowing through the measurement flow path 4 and the signal acquired by the detection circuit 22 under various temperature conditions, consisting of combinations of the temperature of the gas flowing through the measurement flow path 4 and the reference temperature of the thermistor 20 of the flow rate detection unit 8. The correlation data held in the correlation data holding unit 14 (Translator's note: corrected from "4" to −14—) is used by the controller 12 to determine whether the pump 2 is being operated normally.

Next, one example of the determination operation for the normality of the operation of the pump 2 will be described with reference to FIG. 3, together with FIG. 1.

After starting the driving of the pump 2, at the predetermined determination timing, the controller 12 acquires the temperature of the gas flowing through the measurement flow path 4 from the temperature acquisition unit 10 (Step 101) and determines the reference temperature of the thermistor 20 of the flow rate detection unit 8 according to the acquired temperature (Step 102). Here, the reference temperature can be determined using the correlation data held in the correlation data holding unit 14 so that the detection sensitivity of the flow rate of the gas flowing through the measurement flow path 4 is sufficiently high, i.e., the signal acquired by the detection circuit 22 is sufficiently large.

Here, even if the temperature is set to be always higher than the temperature of the gas acquired by the temperature acquisition unit 10 by a certain temperature as the reference temperature, it is not always possible to acquire sufficient sensitivity that is always sufficient in flow rate. FIG. 4 shows a graph showing the correlation between the flow rate of the gas flowing through the measurement flow path 4 and the magnitude of the signal acquired by the detection circuit 22 when the reference temperature of the thermistor 20 is set to T1+α1, T1+α2, T1+α3, T1+α4, and T1+α5, respectively, when the gas flowing through the measurement flow path 4 is relatively low T1 (for example, 4° C.). where α1<α2<α3<α4<α5.

As can be seen from the graph in FIG. 4, basically, the higher the reference temperature of the thermistor 20, the more sensitive the flow rate detection becomes. When the temperature of the gas is a relatively low temperature T1, even if it is set to a reference temperature by adding a relatively low value α1 (e.g., α1=40) to the temperature T1 of the gas, it is possible to acquire sensitivity sufficient for detecting the flow rate of the gas.

Figure 5:
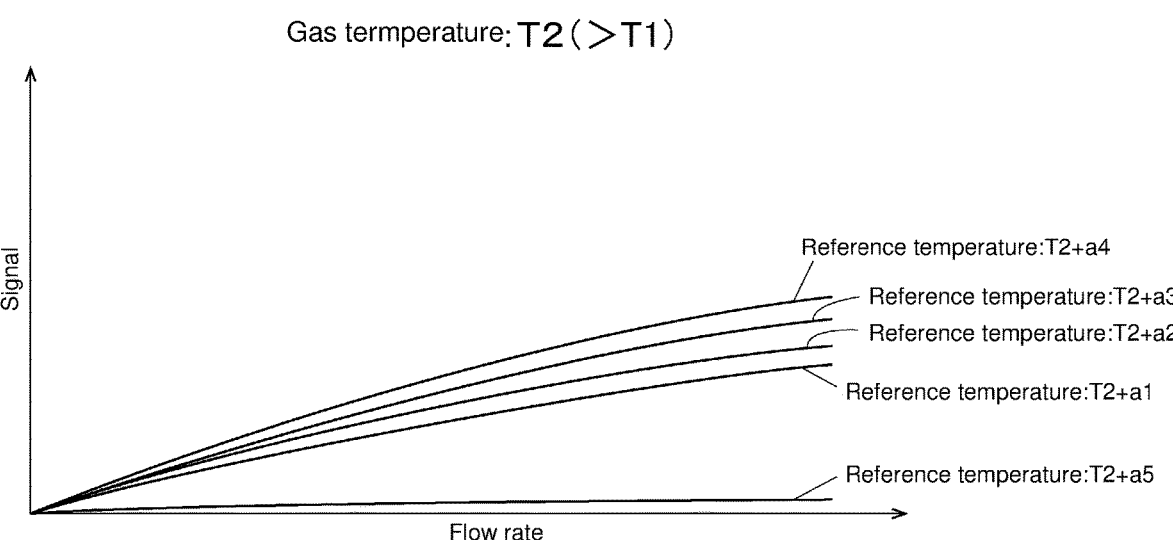
FIG. 5 is a graph showing a correlation between a flow rate and a signal value at each reference temperature when a temperature of a gas flowing into a measurement flow path is T2 (>T1).

On the other hand, as shown in the graph in FIG. 5, when the temperature of the gas flowing through the measurement flow path 4 is relatively high T2 (e.g., 75° C.), even if the reference temperature is determined by adding α5 to the gas temperature T2, there is a risk that sufficient sensitivity for accurate detection of the gas flow rate cannot be acquired. Therefore, a value α (referred to as "incremental temperature") to be added to the temperature T of the gas flowing through the measurement flow path 4 to determine the reference temperature of the thermistor 20 is preferably determined according to the degree of the temperature T of the gas flowing through the measurement flow path 4.

In this example, a table showing the relation between the temperature T of the gas flowing through the measurement flow path 4 and the incremental temperature α has been stored in the correlation data holding unit 14 as correlation data. When the temperature acquisition unit 10 acquires the information on the temperature of the gas flowing through the measurement flow path 4, the controller 12 acquires the incremental temperature α corresponding to the temperature of the acquired gas from the correlation data held in the correlation data holding unit 14 to determine the reference temperature T+α of the thermistor 20.

Returning to FIG. 3, the description will be continuously described. Once the controller 12 determines the reference temperature as described above (Step 102), the detection circuit 22 of the flow rate detection unit 8 controls the voltage applied to the thermistor 20 so that the temperature of the thermistor 20 becomes the reference temperature (Step 103). The controller 12 reads the signal from the detection circuit 22 of the flow rate detection unit 8 (Step 104) and calculates the flow rate of the gas flowing through the measurement flow path 4 using the correlation data holding unit 14 (Step 105). The controller 12 determines whether the calculated gas flow rate is less than the predetermined flow rate (Step 106). When the gas flow rate is less than the predetermined flow rate, the controller 12 determines that the operation of the pump 2 is abnormal (Step 107).

On the other hand, when the calculated flow rate of the gas is equal to or greater than the predetermined flow rate, the controller 12 determines that the pump 2 is operating normally and repeats Steps 101 to 106 at the next determination timing.

Figure 6:
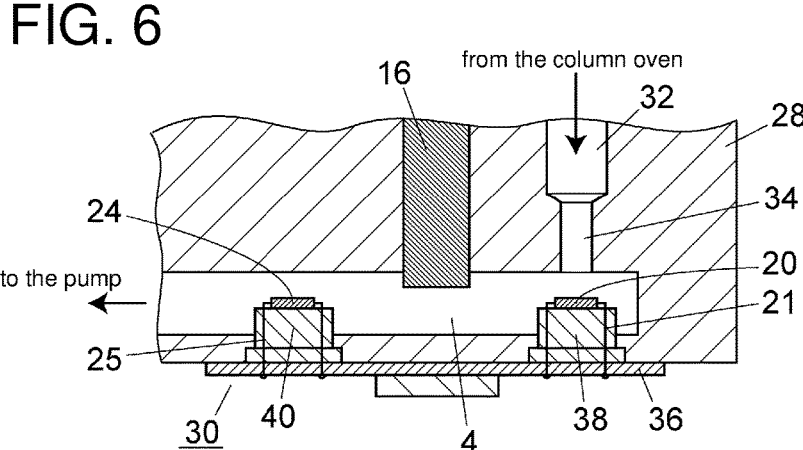
FIG. 6 is a partial cross-sectional view of one example of a structure of a measurement flow path portion of the example.

Next, the structure of a part of the measurement flow path 4 of the gas monitoring device 1 for gas chromatograph will be described with reference to FIG. 6 and FIG. 7.

The measurement flow path 4 is formed in a metal block 28. The block 28 is provided with a connection portion 32 for connecting a piping 200 for drawing out the gas from the column oven 100 of the GC, and an inlet flow path 34 for introducing the gas from the piping 200 connected to the connection portion 32 into the measurement flow path 4.

The thermistor 20 of the flow rate detection unit 8 and the thermistor 24 of the temperature acquisition unit 10 are held on the surface (the upper side in the figure) of the holding board 36 via a septum 38 and a septum 40, respectively, thereby constituting an integral thermistor unit 30. Both the septums 38 and 40 are cylindrical members made of an insulating and resilient material, such as, e.g., silicone rubber and fluoro rubber. The distance between the thermistor 20 and the board 36 is the same as the thickness dimension of the septum 38, and the distance between the thermistor 24 and the board 36 is the same as the thickness dimension of the septum 40. The lead wires 21 and 25 of the thermistors 20 and 24, respectively, are drawn to the back side of the holding board 36 while being covered by the septums 38 and 40 by passing through-holes in the septums 38 and 40, respectively.

Figure 7:
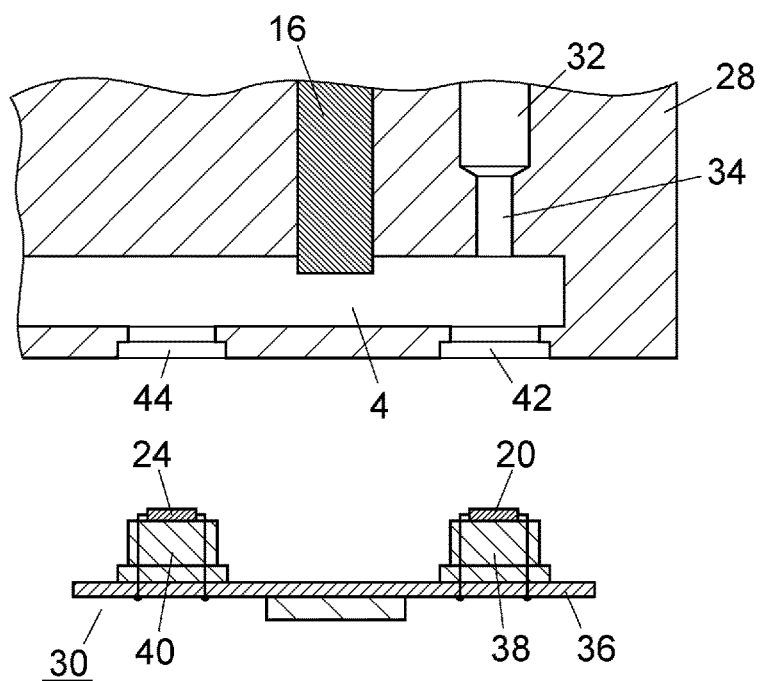
FIG. 7 is a diagram showing a state in which a thermistor unit has been removed from a block in the example.

One outer surface of the block 28 (the lower side in the figure) has two through-holes 42 and 44 leading into the measurement flow path 4 (see FIG. 7). The inner diameter of the through-hole 42 and that of the through-hole 44 are designed to be slightly smaller than that of the septum 38 and that of the septum 40, respectively.

The thermistor unit 30 is attached to the block 28 by fixing the holding board 36 to the block 28 (translator's note: corrected from 38 to 28) in a state in which the holding board 36 is in contact with the outer surface of the block 28 with the septum 38 fitted into the through-hole 42 and the septum 40 fitted into the through-hole 44.

Since the holding board 36 is fixed in a state in which it is in contact with the outer surface of the block 28, the thermistors 20 and 24, which are separated from the holding board 36 by the thickness of the septums 38 and 40, respectively, are positioned at a fixed location in the measurement flow path 4. Note that thermistor 20 may be placed at any position in the measurement flow path 4 in the flow path width direction. However, considering the velocity distribution of the gas flowing through the measurement flow path 4, the detection sensitivity can be improved by placing the thermistor 20 near the center of the cross-section of the measurement flow path 4 where the gas flow velocity is the greatest.

The outer diameter of the septum 38 and that of the septum 40 are slightly larger than the inner diameter of the through-hole 42 and that of the through-hole 44, respectively, thereby ensuring the high sealing performance of the through-holes 42 and 44.

Further, the lead wires 21 and 25 are drawn out to the back of the holding board 36 while being covered by the septums 38 and 40, so that the lead wires 21 and 25 are protected from short-circuiting with the metal block 28.

Note that in this example, the thermistors 20 and 24 are held on a common holding board 36, but the present disclosure is not limited thereto, and the thermistors 20 and 24 may be held on mutually different holding boards. Further, in this example, the shape and dimension of the septum 38 and the septum 40 are identical to each other, but the shape and dimension of the septums 38 and 40 may be different from each other.

The inlet flow path 34 is designed to allow the gas to flow into the measurement flow path 4 from a direction perpendicular (vertical direction in the figure) to the flow direction of the measurement flow path 4 (right-left direction in the figure). The through-hole 42 in the block 28 is provided at a position in the measurement flow path 4 facing the end of the inlet flow path 34, and the thermistor 20 is positioned at the inflow portion of the gas from the inlet flow path 34 in the measurement flow path 4. This causes the gas flowing into the measurement flow path 4 from the inlet flow path 34 to be blown directly against the thermistor 20. Further, the cross-sectional area of the flow path cross-section of the inlet flow path 34 (Translator's note: corrected from 4 to 34) is smaller than the cross-sectional area of a flow path upstream of the inlet flow path and the cross-sectional area of a flow path downstream of the inlet flow path. Therefore, when a gas flows into the measurement flow path 4, its air velocity is temporarily increased, thereby improving the detection sensitivity of the flow rate detection unit 8.

Figure 8:
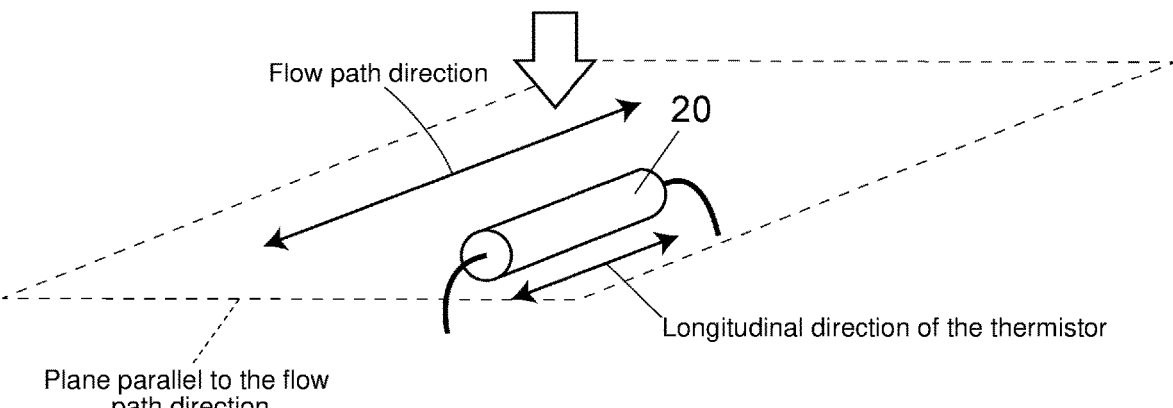
FIG. 8 is a conceptual diagram for describing a relationship between a flow direction of a gas into a measurement flow path and a longitudinal direction of a thermistor of an air flow rate detection unit in the example.

Here, the relation between the flow direction of the gas flowing into the measurement flow path 4 and the thermistor 20 will be described with reference to FIG. 8.

The thermistor 20 has a longitudinal direction. In this example, the longitudinal direction of the thermistor 20 is arranged parallel to the flow direction of the measurement flow path 4, but the longitudinal direction of the thermistor 20 can be in a plane parallel to the flow direction of the measurement flow path 4. When the longitudinal direction of the thermistor 20 is in a plane parallel to the flow direction of the measurement flow path 4, the gas flowing into the measurement flow path 4 from the inlet flow path 34 will always be blown against the thermistor 20 from a direction perpendicular to the longitudinal direction of the thermistor 20. This reduces the variation in the detection sensitivity due to the mounting direction of the thermistor 20, even in the case where the longitudinal direction of the thermistor 20 is not parallel to the flow path direction of the measurement flow path 4.

It should be understood that the example described above is only one example of the embodiment of the gas monitoring device for gas chromatograph according to the present disclosure. Embodiments of the gas chromatograph according to the present disclosure are shown below.

One embodiment of a gas monitoring device for gas chromatograph, according to the present disclosure, includes:

a pump configured to draw out a gas from a space in a column oven of the gas chromatograph;

a measurement flow path through which the gas drawn out of the space in the column oven by the pump flows;

a gas sensor having a sensing unit exposed to an inside of the measurement flow path, the gas sensor being configured to detect a specific component in the gas flowing through the measurement flow path;

a flow rate detection unit including a self-heating element arranged in the measurement flow path, the flow rate detection unit being configured to acquire a signal corresponding to a flow rate of the gas flowing through the measurement flow path by controlling a voltage applied to the self-heating element a temperature of the self-heating element is kept constant at a reference temperature;

a temperature acquisition unit configured to acquire temperature information about the gas flowing into the measurement flow path; and a controller configured to control operations of the pump and the flow rate detection unit, wherein the controller is configured to set the reference temperature of the self-heating element of the flow rate detection unit to a temperature of the gas flowing into the measurement flow path based on the temperature information acquired by the temperature acquisition unit and determine normality of the operation of the pump based on the signal acquired by the flow rate detection unit.

In the gas monitoring device for gas chromatograph, as recited in the above-described aspect [1], according to one embodiment, it may be configured such that the gas monitoring device further includes:

a correlation data holding unit configured to hold correlation data indicating a correlation between the temperature of the gas flowing into the measurement flow path and a temperature to be set as the reference temperature of the self-heating element, and wherein the reference temperature is configured to be determined using the temperature information acquired by the temperature acquisition unit and the correlation data held in the correlation data holding unit.

In the gas monitoring device for gas chromatograph, as recited in the above-described aspect [2], it may be configured such that the correlation data holding unit holds correlation data between the flow rate of the gas flowing through the measurement flow path and the signal under a plurality of temperature conditions that are a combination of the reference temperature of the self-heating element and the temperature of the gas flowing into the measurement flow path, and the controller is configured to acquire the flow rate of the gas flowing through the measurement flow path from the signal acquired by the flow rate detection unit, using the correlation data held in the correlation data holding portion, and > determine the normality of the operation of the pump by whether the flow rate of the gas flowing through the measurement flow path is equal to or less than a predetermined flow rate.

The gas monitoring device for gas chromatograph, as recited in the above-described aspect [2], according to one embodiment, it may be configured such that the temperature acquisition unit includes a temperature sensor disposed in the measurement flow path separately from the self-heating element of the flow rate detection unit. This aspect [2] can be combined with the above-described aspect [1].

In the above-described aspect [2], it may be configured such that the temperature sensor of the temperature acquisition unit is placed at a position downstream of the self-heating element of the flow rate detection unit.

In the above-described aspect [3] according to one embodiment, it may be configured such that the temperature acquisition unit is configured to acquire a set temperature of the column oven as temperature information about the temperature of the gas flowing into the measurement path. This aspect [3] can be combined with the above-described aspect [1].

In the above-described aspect [4] according to one embodiment, it may be configured such that the gas monitoring device for gas chromatograph further includes: an inlet flow path for introducing the gas into the measurement flow path, wherein the inlet flow path is provided to introduce the gas into the measurement flow path from a direction perpendicular to a flow path direction of the measurement flow path, and wherein the self-heating element has a longitudinal direction, the longitudinal direction being within a plane parallel to the flow path direction, and is placed at a position where the gas flows into the measurement flow path from the inlet flow path so that the gas flowing into the measurement flow path is introduced onto the self-heating element from a direction perpendicular to the longitudinal direction.

This aspect [4] can be combined with any one the above-described aspects [1] to [3].

In the above-described aspect [4] according to one embodiment, it may be configured such that a cross-sectional area of a flow path cross-section of the inlet flow path is smaller than a cross-sectional area of a flow path cross-section of a flow path upstream of the inlet flow path and that downstream of the inlet flow path.

In the above-described aspect [5] according to one embodiment, it may be configured such that the measurement flow path is formed in a block, wherein the block has a through-hole that leads to the measurement flow path, and the self-heating element of the flow rate detection unit is held by a holding board fixed to an outer surface of the block, the outer surface having the through-hole, and is inserted into the through-hole in a state in which the self-heating element is kept at a predetermined distance from the holding board.

This aspect [5] can be combined with any one the above-described aspects [1] to [4].

In the above-described aspect [5] according to one embodiment, it may be configured such that > a septum with insulating and elastic properties is interposed between the self-heating element of the flow rate detection unit and the holding board, and lead wires drawn from the self-heating element of the flow rate detection unit are covered by the septum, and the through-hole is sealed by the septum fitted into the through-hole of the block.

In the above-described aspect [6] according to one embodiment, it may be configured such that the specific component is hydrogen.

This aspect [6] can be combined with any one the above-described aspects [1] to [5].

DESCRIPTION OF REFERENCE SYMBOLS

1: Gas monitoring device for gas chromatograph
2: Pump
4: Measurement flow path
6: Gas sensor
8: Flow rate detection unit
10: Temperature acquisition unit
12: Controller
14: Correlation data holding unit
16: Sensing unit
18, 22, 26: Detection circuit
20, 24: Thermistor
21, 25: Lead wire
28: Heater block
30: Thermistor unit
32: Pipe connection unit
34: Inlet flow path
36: Holding board
38, 40: Septum

The invention claimed is:

1. A gas monitoring device for gas chromatograph, comprising:

a pump configured to draw out a gas from a space in a column oven of the gas chromatograph;

a measurement flow path through which the gas drawn out of the space in the column oven by the pump flows;

a gas sensor having a sensing unit exposed to an inside of the measurement flow path, the gas sensor being configured to detect a specific component in the gas flowing through the measurement flow path;

a flow rate detection unit including a self-heating element arranged in the measurement flow path, the flow rate detection unit being configured to acquire a signal corresponding to a flow rate of the gas flowing through the measurement flow path by controlling a voltage applied to the self-heating element so that a temperature of the self-heating element is kept constant at a reference temperature;

a temperature acquisition unit configured to acquire temperature information about the gas flowing into the measurement flow path; and a controller configured to control operations of the pump and the flow rate detection unit, wherein the controller is configured to set the reference temperature of the self-heating element of the flow rate detection unit to a temperature of the gas flowing into the measurement flow path based on the temperature information acquired by the temperature acquisition unit and determine normality of the operation of the pump based on the signal acquired by the flow rate detection unit, the gas monitoring device for gas chromatograph further comprising:

a correlation data holding unit configured to hold correlation data indicating a correlation between the temperature of the gas flowing into the measurement flow path and a temperature to be set as the reference temperature of the self-heating element, and wherein the reference temperature is configured to be determined using the temperature information acquired by the temperature acquisition unit and the correlation data held in the correlation data holding unit.

2. The gas monitoring device for gas chromatograph, as recited in claim 1, wherein the correlation data holding unit holds correlation data between the flow rate of the gas flowing through the measurement flow path and the signal under a plurality of temperature conditions that are a combination of the reference temperature of the self-heating element and the temperature of the gas flowing into the measurement flow path, and wherein the controller is configured to acquire the flow rate of the gas flowing through the measurement flow path from the signal acquired by the flow rate detection unit, using the correlation data held in the correlation data holding portion, and determine the normality of the operation of the pump by whether the flow rate of the gas flowing through the measurement flow path is equal to or less than a predetermined flow rate.

3. The gas monitoring device for gas chromatograph, as recited in claim 1, wherein the temperature acquisition unit includes a temperature sensor disposed in the measurement flow path separately from the self-heating element of the flow rate detection unit.

4. The gas monitoring device for gas chromatograph, as recited in claim 3, wherein the temperature sensor of the temperature acquisition unit is placed at a position downstream of the self-heating element of the flow rate detection unit.

5. The gas monitoring device for gas chromatograph, as recited in claim 1, wherein the temperature acquisition unit is configured to acquire a set temperature of the column oven as temperature information about the temperature of the gas flowing into the measurement path.

6. The gas monitoring device for gas chromatograph, as recited in claim 1, further comprising:

an inlet flow path for introducing the gas into the measurement flow path, wherein the inlet flow path is provided to introduce the gas into the measurement flow path from a direction perpendicular to a flow path direction of the measurement flow path, and wherein the self-heating element has a longitudinal direction, the longitudinal direction being within a plane parallel to the flow path direction, and is placed at a position where the gas flows into the measurement flow path from the inlet flow path so that the gas flowing into the measurement flow path is introduced onto the self-heating element from a direction perpendicular to the longitudinal direction.

7. The gas monitoring device for gas chromatograph as recited in claim 6, wherein a cross-sectional area of a flow path cross-section of the inlet flow path is smaller than a cross-sectional area of a flow path cross-section of a flow path upstream of the inlet flow path and that downstream of the inlet flow path.

8. The gas monitoring device for gas chromatograph, as recited in claim 1, wherein the measurement flow path is formed in a block, wherein the block has a through-hole that leads to the measurement flow path, and wherein the self-heating element of the flow rate detection unit is held by a holding board fixed to an outer surface of the block, the outer surface having the through-hole, and is inserted into the through-hole in a state in which the self-heating element is kept at a predetermined distance from the holding board.

9. The gas monitoring device for gas chromatograph, as recited in claim 8, wherein a septum with insulating and elastic properties is interposed between the self-heating element of the flow rate detection unit and the holding board, and wherein lead wires drawn from the self-heating element of the flow rate detection unit are covered by the septum, and the through-hole is sealed by the septum fitted into the through-hole of the block.

10. The gas monitoring device for gas chromatograph as recited in claim 1, wherein the specific component is hydrogen.

* * * * *